UNITED STATES PATENT OFFICE.

WILLIAM ROY MOTT, OF LAKEWOOD, OHIO, ASSIGNOR, BY MESNE ASSIGNMENTS, TO NATIONAL CARBON COMPANY, INC., A CORPORATION OF NEW YORK.

ARC-LAMP ELECTRODE.

1,244,359.     Specification of Letters Patent.     Patented Oct. 23, 1917.

No Drawing.     Application filed November 6, 1916. Serial No. 129,677.

*To all whom it may concern:*

Be it known that I, WILLIAM R. MOTT, a citizen of the United States, and resident of Lakewood, in the county of Cuyahoga and State of Ohio, have invented a certain new and useful Improvement in Arc-Lamp Electrodes, of which the following is a full, clear, and exact description.

This invention relates to arc lamp electrodes containing rare-earth metal fluorids and more particularly to a method of treating a rare-earth metal fluorid containing a certain per cent. of combined sulfur trioxid ($SO_3$) as a sulfate impurity, whereby the resulting material is made advantageous for use in arc lamp electrodes.

These rare-earth metal fluorids are obtained from the residue of monazite sands after the removal of the thorium which is used in the well known Welsbach mantles. Usually the material known as "Welsbach residue" consists of the sulfates of cerium mixed with other rare-earth metal sulfates such as lanthanum, neodymium, præseodymium and yttrium and some impurities. To convert these sulfates into fluorids they are treated with hydrofluoric acid to precipitate the insoluble rare-earth metal fluorids. The product of this precipitation contains more or less sulfates which cannot be readily washed out. While the manner in which the sulfur trioxid ($SO_3$) is combined is not certain, it is probable that it is combined in the form of rare-earth metal sulfates or basic sulfates.

Although the above described process for making rare-earth fluorids is the one commonly used, it should be understood that this invention is not limited to the use of rare-earth fluorid made by above process, but is applicable to rare-earth fluorid contaminated with sulfate made by any process whatsoever.

The use of rare-earth metal fluorids containing rare-earth metal sulfates in an arc lamp electrode has several disadvantages. In the first place, the fluorin content is decreased, which increases the tendency to form insulating beads of slag on the ends of the carbons. Further, the hygroscopic nature of the rare-earth metal sulfates interferes with the normal baking of solid or homogeneous flame carbons and tends to cause an undue increase in hardness of carbons, which in itself increases the slagging tendency. When heated to moderate temperatures, alone or in flame carbons in the absence of salts forming insoluble sulfates, rare-earth metal sulfates liberate some sulfur trioxid ($SO_3$) which combines with any water vapor to form sulfuric acid and this tends to produce corrosion of the metal parts of the lamps. The reaction of free sulfur trioxid ($SO_3$) in the presence of water vapor with rare-earth metal fluorids also liberates hydrofluoric acid which increases the globe etching. Again, the presence of rare-earth metal sulfates also has been found to decrease the candle power. Since the rare-earth sulfates are somewhat soluble and hygroscopic, they cause coagulation of the silicate binder in cored carbons, thus reducing the ultimate strength and compactness of the core and even permitting portions of the core to fall out.

According to the present invention these disadvantages of the rare-earth sulfates are eliminated by adding certain insoluble (water insoluble) fluorids to the materials containing the rare-earth metal sulfates to facilitate the formation of insoluble sulfates and rare-earth fluorids therefrom. The insoluble fluorids suitable for this purpose must also form sulfates, insoluble in water, such as fluorids of barium, strontium and lead, although I have found barium fluorid to be most satisfactory.

When rare-earth metal sulfate is heated with barium fluorid, the following reaction occurs:

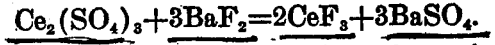

$$Ce_2(SO_4)_3 + 3BaF_2 = 2CeF_3 + 3BaSO_4.$$

This reaction has been written for cerium sulfate by way of example, but it applies also to all the other rare-earths of the Welsbach residue.

The heating of the rare-earth metal sulfates and the barium fluorid may be accomplished in various ways. Since it is necessary to calcine the precipitated rare-earth fluorids to remove water of crystallization the barium fluorid may be added before the usual calcination and the two results accomplished by the same heating. The calcining may be carried out by heating to from 500 to 800° C. This method can be advantageously used with fluorids intended for cored flame carbons although there is no disadvantage in the case of solid flame carbons. However, since solid flame carbons are baked to set the pitch binder, the barium fluorid need not be added until after calcination of the rare-earth fluorids, as the baking of the electrodes will bring about the desired reaction between the barium fluorid and the sulfate content, which by transposition gives the insoluble stable sulfate. Also under certain conditions the heat of the arc may be relied upon to bring about the reaction.

Both the barium sulfate and the rare-earth fluorids resulting from the reaction are insoluble in water and practically non-hygroscopic. Therefore the silicate binder of the coring material for cored flame carbons will not be coagulated. When used in solid flame carbons, these salts do not tend to produce hard carbons of such a texture and nature as to increase slagging.

The resulting barium sulfate is also a desirable material because it possesses good flaming properties and increases the life of the electrodes.

Most arc lamp electrodes containing flaming materials have calcium fluorid as a constituent and when impure rare-earth fluorids are combined therewith in the electrode, calcium sulfate is formed to some extent by reacting on the sulfate content. In cored carbons calcium sulfate is sufficiently soluble to cause coagulation of the alkali silicate binder which gives an inferior carbon. In electrodes having both the fluorids of barium and calcium, barium sulfate will be formed more readily than calcium because of its greater stability and the greater heat liberated in its formation.

Other insoluble fluorids of elements forming insoluble sulfates which have no inherent properties which preclude their use in arc lamp electrodes, may be used, such as the fluorids of strontium and lead, but in general barium fluorid is the most satisfactory.

To bring about the reaction set forth in the previous equation theoretically about two and a half (2.32%) per cent. of barium fluorid would be required for each per cent. of combined sulfur trioxid ($SO_3$) present in the rare-earth fluorids. However, this proportion need not be adhered to as a beneficial effect is obtained if from one-half to five per cent. of barium fluorid is added for each per cent. of sulfur trioxid ($SO_3$) in the rare-earth fluorids. As a rule, a slight excess of barium fluorid above that calculated from the equation is to be preferred.

As a flame mix for solid flame carbons, the following is given by the way of example:

| | |
|---|---|
| Rare-earth metal fluorids which may contain two to three per cent. of $SO_3$ as sulfate impurity | 60 parts. |
| Calcium sulfate | 16 " |
| Calcium fluorid | 18 " |
| Barium fluorid | 6 " |

About 40 parts of the above mix is combined with 60 parts of a carbon flour base and forced with suitable binder and baked in a manner well known to makers of flame carbons.

While my invention is described chiefly in connection with the treatment if impure rare-earth metal fluorids, it is not necessarily limited thereto. Another aspect of the invention is the treatment of rare-earth metal sulfate with barium fluorid to form rare-earth fluorid. Still another aspect of the invention is the use in arc lamp electrodes of the combination of rare-earth metal sulfates and barium fluorid or rare-earth metal fluorids and barium sulfate.

Having described my invention, what I claim is:

1. The process of making an arc lamp electrode which consists in mixing rare-earth metal fluorids containing sulfates with an insoluble fluorid of an element forming an insoluble sulfate.

2. The process of making an arc lamp eelctrode which consists in mixing rare-earth metal fluorids containing sulfates with an insoluble fluorid of an element forming an insoluble sulfate and heating to form rare-earth metal fluorid and an insoluble sulfate.

3. The process of making rare-earth metal fluorids which consists in adding barium fluorid to rare-earth metal sulfates and calcining.

4. The process of eliminating sulfates from rare-earth metal fluorids which consists in adding barium fluorid thereto and calcining.

5. The process of eliminating rare-earth metal sulfates from rare-earth metal fluorids which consists in adding barium fluorid thereto and calcining to form barium sulfate and rare-earth fluorids.

6. The process of making an arc lamp electrode which consists in mixing rare-earth metal fluorids containing sulfates with barium fluorid.

7. The process of making an arc lamp electrode which consists in mixing rare-earth metal fluorids containing rare-earth metal sulfates with barium fluorid and heating to form rare-earth metal fluorids and barium sulfate.

8. The process of making an arc lamp electrode which consists in mixing a binder, carbon and rare-earth metal fluorids containing rare-earth metal sulfates with barium fluorid and baking to set the binder and form rare-earth metal fluorids and barium sulfate.

9. In arc lamp electrodes, the combination of barium fluorid with rare earth fluorids containing sulfate impurities.

10. In an arc lamp electrode, rare-earth metal fluorids containing a small amount of sulfate and barium fluorid amounting to from one-half to five times the weight of combined sulfur trioxid ($SO_3$) contained in the sulfate of the rare-earth material.

11. An arc lamp electrode containing rare-earth metal fluorids and barium sulfate.

12. An arc lamp electrode containing carbon, calcium fluorid, rare-earth metal fluorid and barium sulfate.

13. An arc lamp electrode containing rare-earth metal sulfates and barium fluorid.

In testimony whereof, I hereunto affix my signature.

WM. ROY MOTT.